Patented July 25, 1944

2,354,317

UNITED STATES PATENT OFFICE 2,354,317

CHROMANE AND PROCESS FOR PRODUCING SAME

Otto Hromatka, Darmstadt, Germany, assignor to Merck & Co. Inc., Rahway, N. J., a corporation of New Jersey No Drawing. Application May 9, 1939, Serial No. 272,679. In Germany May 14, 1938

8 Claims. (Cl. 260—333)

This invention relates to chromanes and to processes for their production.

I have now found a relatively simple process for the production of the compounds of the formula

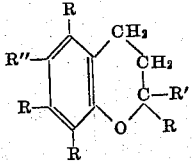

where R is a methyl radical, R' is an alkyl radical and R" is a radical which is capable of being converted into a hydroxyl group, as for example R" may be an acylamino-, amino-, nitro-, or nitroso-radical, or it may be a sulfonic acid group, or a halogen group. These compounds may then be readily converted to a corresponding hydroxy chromane, the latter being similar to α-tocopherol, the best known naturally occurring substance with vitamin E activity.

According to this invention a diene, such as isoprene, dimethylbutadiene, phytadiene, or the like, or an allylic halide such as, for example, dimethylallylbromide and phytyl bromide, or the corresponding alcohols, as phytol, or the like, is condensed with 2,3,6-trimethyl-4-hydroxy-benzene which is substituted at position-1 with a group or radical which is capable of being converted to a hydroxyl group. The product thus obtained is then converted by known methods to the corresponding hydroxy chromane.

The following example is presented by way of illustration and not of limitation as to any obvious equivalent modifications which may be made therein without departing from the scope and spirit of the invention.

Example 1-formylamino-2,3,6-trimethyl-4-hydroxy-benzene is condensed with isoprene; 2,2,5,7,8-pentamethyl-6-formylamino-chromane having a melting point of about 158° C. is obtained. About 1 gm. of the latter is refluxed for about 1½ hours with about 20 cc. of 25% hydrochloric acid. The compound gradually goes into solution with simultaneous separation of 2,2,5,7,8-pentamethyl-6-amino-chromane hydrochloride crystals. After cooling, the latter are filtered off by suction and washed with ether. They are mixed with water and treated with ammonia in the separating funnel. The 2,2,5,7,8-pentamethyl-6-amino-chromane formed is extracted with ether. The ether residue is purified by distillation in high vacuo and forms colorless crystals having a melting point of about 41° C.

About 0.65 gm. of 2,2,5,7,8-pentamethyl-6-amino-chromane are dissolved hot in about 4 cc. of water and 100 cc. of 16% sulfuric acid and then cooled to 0° C. Thereby, the sulfate precipitates in finely crystallized form. Then 29.5 cc. of a n/10 solution of sodium nitrite are slowly added dropwise with stirring. After adding the calculated quantity, free nitrous acid can be proved by means of potassium iodide starch paper. The clear solution is heated to boiling in a nitrogen atmosphere. As a result thereof, an oil separates. After cooling the solution, the oil is extracted with ether. The ether solution is evaporated and the crystalline residue is recrystallized from methanol with the addition of water. The 2,2,5,7,8-pentamethyl-6-hydroxy-chromane thus obtained melts at about 93-94° C.

Instead of isoprene specifically illustrated, other dienes may be substituted, or allylic halides may be substituted as previously disclosed herein, and in such case, R' will vary in accordance with the particular diene or allylic halide employed as will be readily apparent to those skilled in the art.

17.9 gm. 1-formylamino-2,3,6-trimethyl-4-hydroxybenzene, 7.0 gm. isoprene and 60 cc. of 100% formic acid are heated for 4 hours to 100° C. in a closed tube. The reaction products are separated from acid and phenolic compounds by means of alkali and recrystallised, for example from ethyl acetic ester. The product is 2,2,5,7,8-pentamethyl-6-formyl-amino-chromane, having a M. P. 158° C.

17.9 gm. 1-formylamino-2,3,6-trimethyl-4-hydroxybenzene, 14.9 gm. dimethylallylbromide, 8.0 gm. zinc chloride and 50 cc. benzine are warmed for 2 hours at 70° C. The mixture obtained is extracted by boiling with benzene. The benzene solution is extracted by shaking with alkali, concentrated by evaporation and the resultant 2,2,5,7,8-pentamethyl-6-formylaminochromane, M. P. 158° C., is purified.

15.1 gm. 1-amino-2,3,6-trimethyl-4-hydroxy-benzene, 15 cc. isoprene and 60 cc. 30% glacial acetic acid hydrobromic acid are heated at 100° C. for 14 hours in a tube. The products of reaction are concentrated by boiling in vacuo, taken up with benzene and aqueous alkali and extracted by shaking with alkali. From the so purified benzene solution the hydrochloride of the 2,2,5,7,8-pentamethyl-6-aminochromane can be prepared by shaking with diluted hydrochloric acid. The crystallised compound melts at 276° C. The yield is 11.3 gm.

I claim:

1. 2,5,7,8-tetramethyl-2-alkyl-6-formylaminochromane.

2. 2,2,5,7,8-pentamethyl-6-formylaminochromane.

3. Process comprising condensing isoprene with 1-formylamino-2,3,6-trimethyl-4-hydroxy-benzene, under acidic conditions.

4. 2,5,7,8-tetramethyl-2-(4',8',12'-trimethyl-tridecyl)-6-formylamino chromane.

5. Process for the production of 2,5,7,8-tetramethyl-2-alkyl-6-formylamino chromanes comprising condensing a substance selected from the group consisting of aliphatic α-gamma-dienes and gamma-alkylated allyl halides with 1-formylamino-2,3,6-trimethyl-4-hydroxy benzenes, under acidic conditions.

6. Process for the production of 2,2,5,7,8-pentamethyl-6-amino chromane comprising condensing isoprene with 1-formylamino-2,3,6-trimethyl-4-hydroxy benzene, under acidic conditions.

7. Process for the production of 2,2,5,7,8-pentamethyl-6-formylamino chromane comprising condensing dimethyl allyl bromide with 1-formylamino-2,3,6-trimethyl-4-hydroxy benzene, under acidic conditions.

8. Process for the production of 2,5,7,8-tetramethyl-2-(4',8',12'-trimethyl-tridecyl)-6-formylamino chromane comprising condensing phytyl bromide with 1-formylamino-2,3,6-trimethyl-4-hydroxy benzene, under acidic conditions.

OTTO HROMATKA.